(12) United States Patent
Perkins et al.

(10) Patent No.: US 11,952,879 B2
(45) Date of Patent: Apr. 9, 2024

(54) CONNECTION SYSTEMS AND METHODS FOR HYDRAULIC FRACTURING

(71) Applicant: McClinton Energy Group, LLC, Midland, TX (US)

(72) Inventors: Jeremy Perkins, Midland, TX (US); Aaron Ladwig, Midland, TX (US); Tommy McClinton, Midland, TX (US)

(73) Assignee: MCCLINTON ENERGY GROUP, LLC, Midland, TX (US)

( * ) Notice: Subject to any disclaimer, the term of this patent is extended or adjusted under 35 U.S.C. 154(b) by 357 days.

(21) Appl. No.: 17/205,759

(22) Filed: Mar. 18, 2021

(65) Prior Publication Data
US 2022/0298903 A1   Sep. 22, 2022

(51) Int. Cl.
*E21B 43/26* (2006.01)
*F16L 37/08* (2006.01)

(52) U.S. Cl.
CPC .......... *E21B 43/2607* (2020.05); *E21B 43/26* (2013.01); *F16L 37/082* (2013.01)

(58) Field of Classification Search
CPC ...... E21B 43/2607; E21B 43/26; F16L 41/03; F16L 57/06
See application file for complete search history.

(56) References Cited

U.S. PATENT DOCUMENTS

| 4,603,887 | A  | * | 8/1986  | Mayfield ............. E21B 43/2607 |
| | | | | 285/298 |
| 10,494,878 | B2 | * | 12/2019 | Scott ....................... E21B 17/05 |
| 10,570,692 | B1 | * | 2/2020  | Sizemore ............ E21B 43/2607 |
| 11,180,979 | B1 | * | 11/2021 | Leuchtenberg ....... E21B 33/038 |
| 2017/0138144 | A1 | * | 5/2017  | Christopherson ... E21B 43/2607 |
| 2019/0071946 | A1 | * | 3/2019  | Painter .................. E21B 33/068 |
| 2019/0203862 | A1 | * | 7/2019  | Ungchusri ................ F17D 1/08 |
| 2020/0208747 | A1 | * | 7/2020  | Babineaux .............. F16L 23/04 |
| 2021/0199217 | A1 | * | 7/2021  | Bucciarelli ......... E21B 43/2607 |
| 2022/0090474 | A1 | * | 3/2022  | Clark ...................... E21B 43/26 |

* cited by examiner

*Primary Examiner* — James G Sayre
(74) *Attorney, Agent, or Firm* — Nolte Lackenbach Siegel

(57) ABSTRACT

Disclosed are systems and methods for connecting a hydraulic fracturing fluid source to various wells at a given well site. In general, use of disclosed systems and methods provide for repositioning (refocusing) the hydraulic fracturing operation amongst multiple wells may be achieved. In one example, a system to reroute fracturing fluid from a source to various wells at a well site may be provided. The use of adapters and quick clamp connections allow hydraulic fracturing fluid to be rerouted between various wells in a manner to decrease the cost and reduce hazards associated with changing hydraulic fracturing locations. Modular components of the system (and an overall modular design of the system itself) may allow a centralized manifold to be relocated to various locations at one or more well sites.

17 Claims, 15 Drawing Sheets

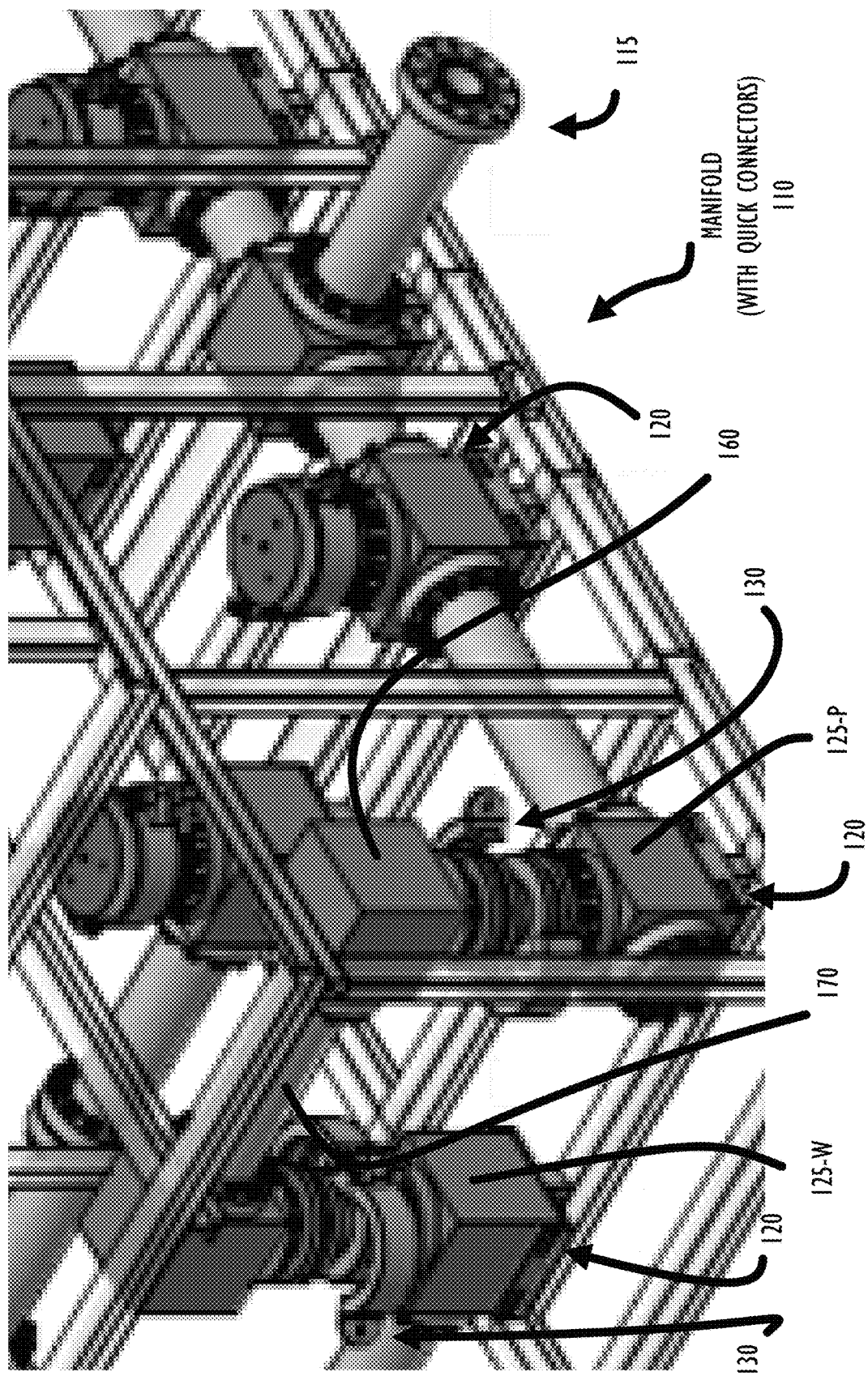

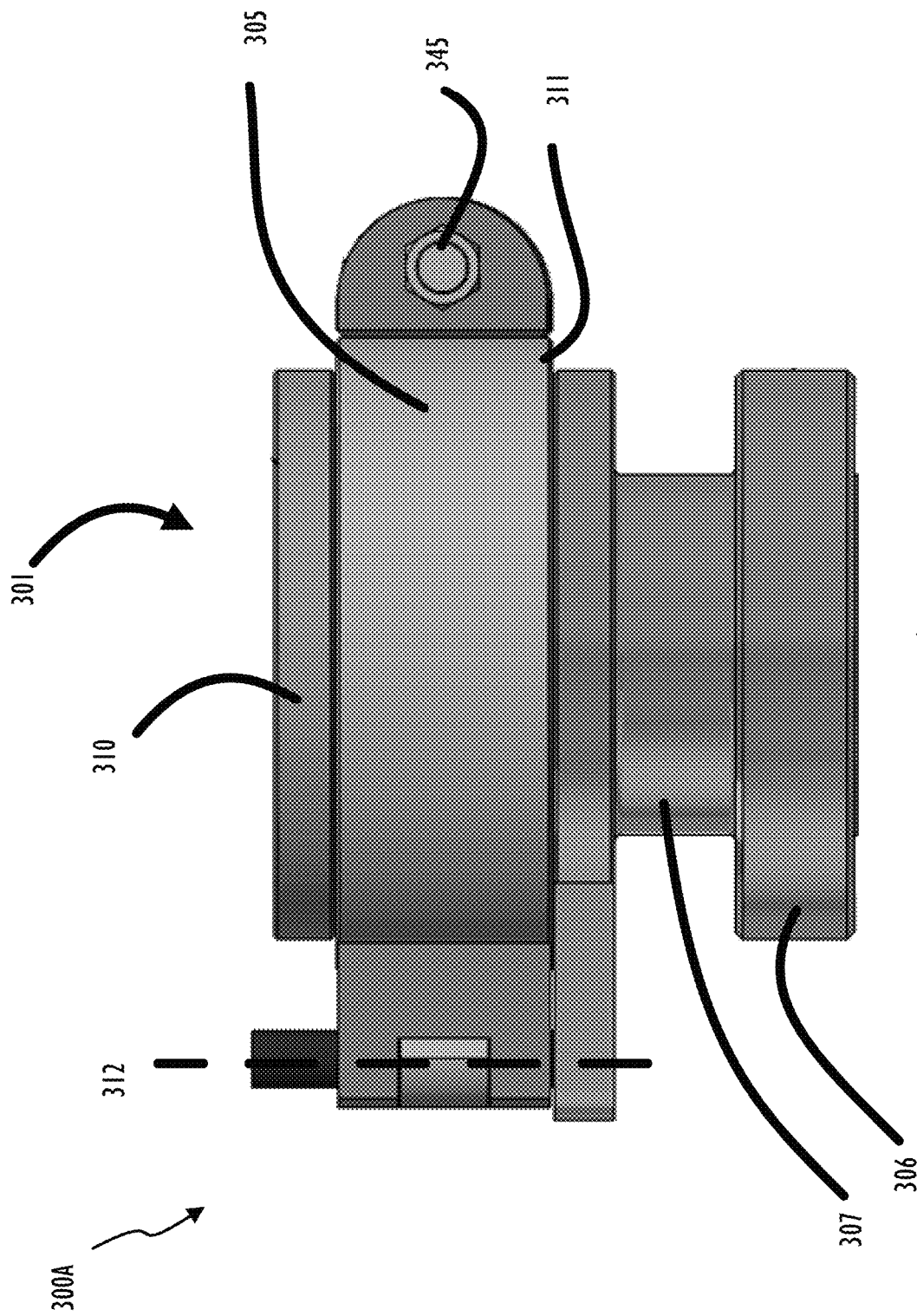

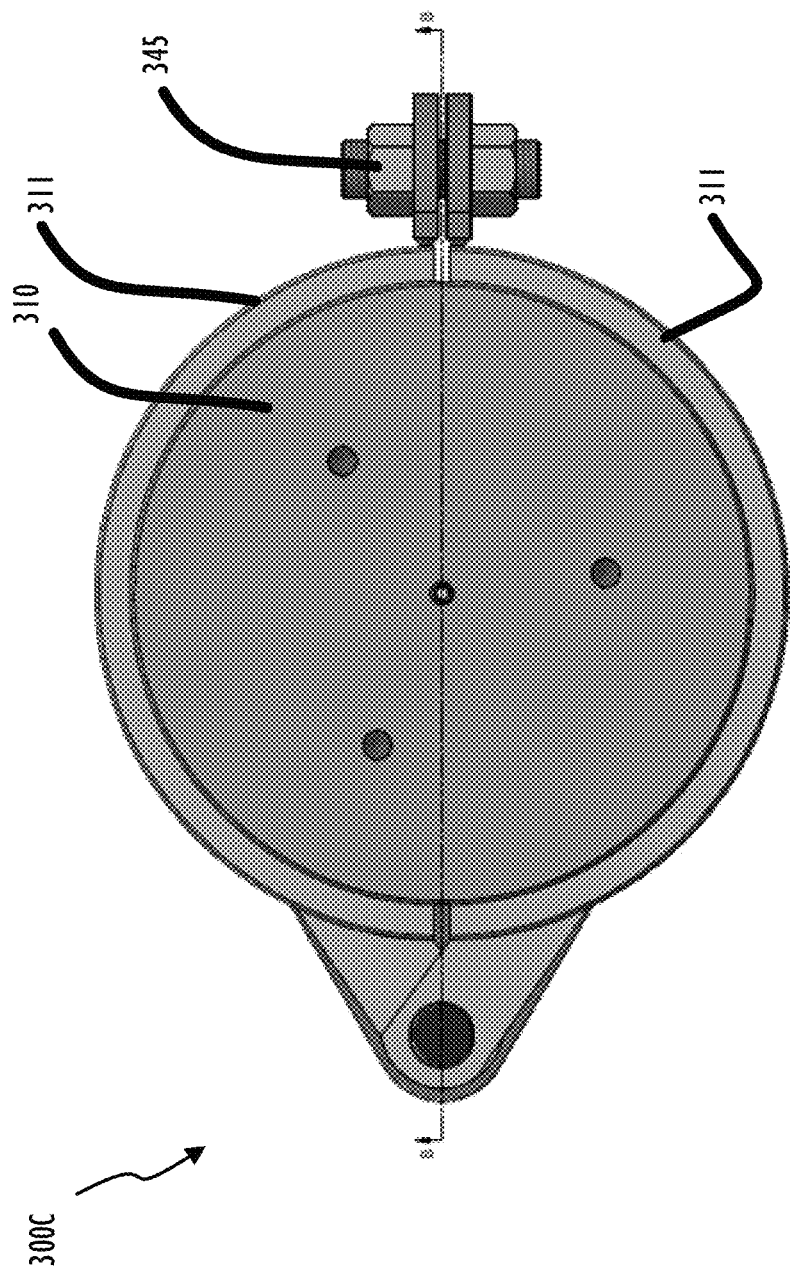

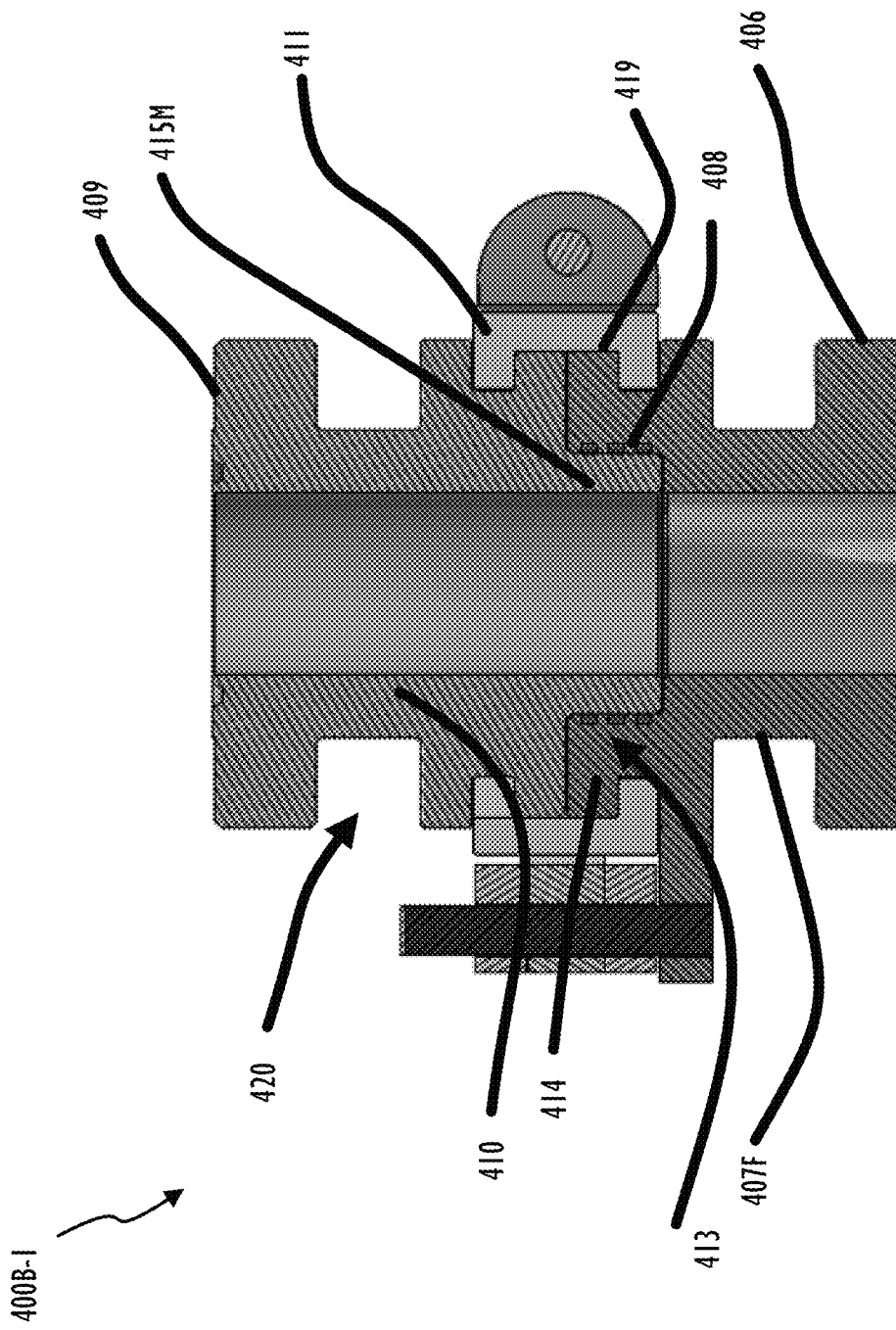

CONNECTION SYSTEMS AND METHODS FOR HYDRAULIC FRACTURING

BACKGROUND

In hydrocarbon industries, during hydraulic fracturing operations, multiple wells may be present at a particular well site location. Hydraulic fracturing refers to a stimulation treatment that is performed on a hydrocarbon well, such as oil and/or gas wells, in low-permeability reservoirs. Hydraulic fracturing fluids may be pumped at high pressure into the reservoir to be treated, thereby causing a vertical fracture to open. The wings of the fracture may then extend away from the wellbore in opposing directions according to the natural stresses within the formation. Proppant, such as grains of sand of a particular size, is mixed with the treatment fluid to keep the fracture open when the treatment is complete. Hydraulic fracturing thereby may be used to create high-conductivity communication within a large area of a formation allow bypasses for damages that may exit in the near-wellbore area.

In order to provide hydraulic fracturing for wells, a hydraulic fracturing fluid source may be connected to a well. The hydraulic fracturing fluid source may be connected through various conduits, pipes, transmission lines, and the like. The control by which well hydraulic fracturing fluid is pumped into a formation may include the use of various valves, connections, and the like. The time required to transition between wells may negatively impact the cost effectiveness and efficiency of the hydraulic fracturing operations.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

FIGS. 1A-C illustrate various magnifications of a top, perspective, schematic representation of a hydraulic fracturing system, according to embodiments of the present disclosure.

FIG. 3 is a side view of a clamp connector system (with plug), according to embodiments of the present disclosure.

FIG. 5 is a top view of a clamp connector system (with plug), according to embodiments of the present disclosure.

FIGS. 8A-B illustrate a first and second cross-sectional view (for slight variations of internal components) of the clamp connector system of FIG. 7, according to embodiments of the present disclosure.

DETAILED DESCRIPTION

Figure 1A:
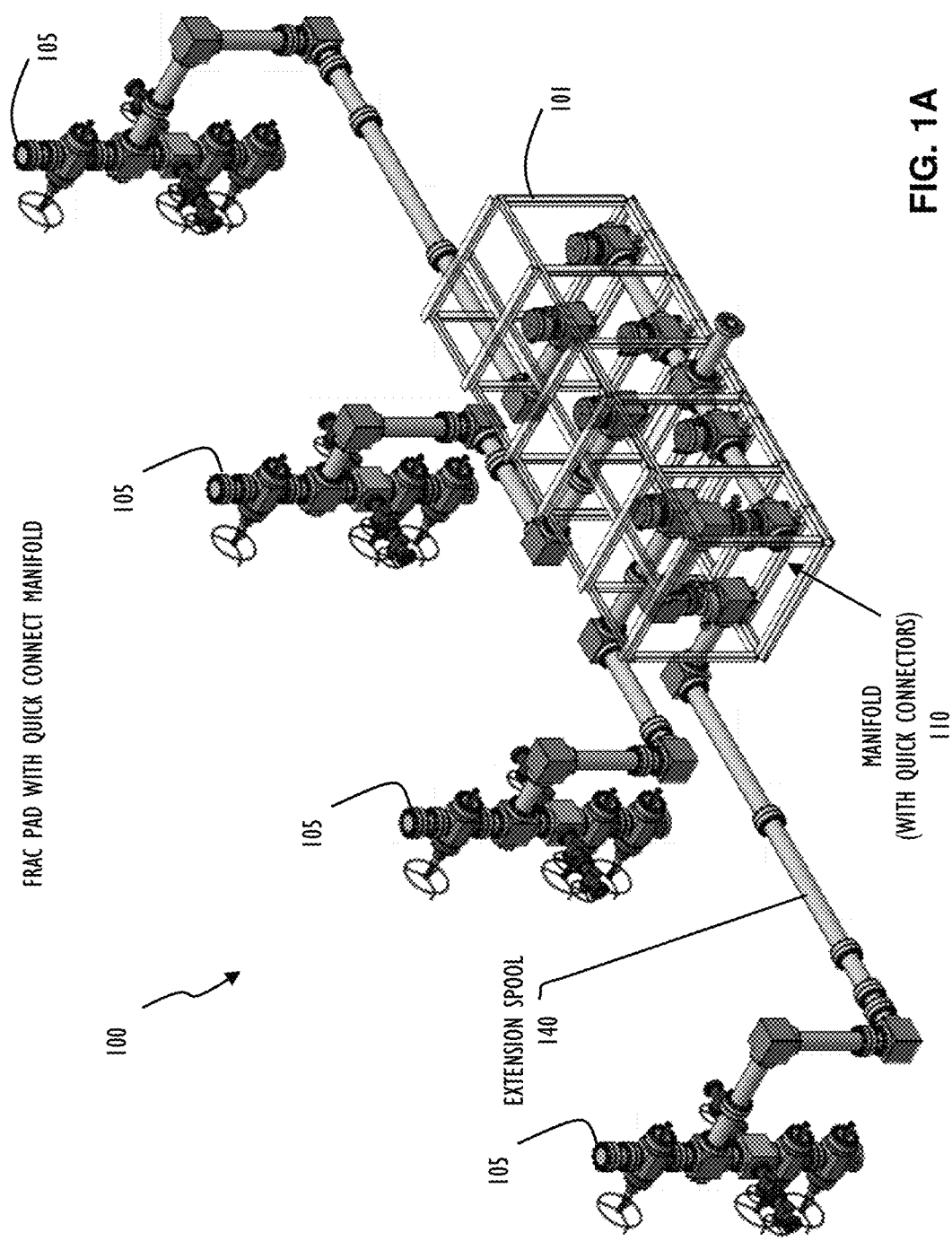

Illustrative examples of the subject matter claimed below will now be disclosed. In the interest of clarity, not all features of an actual implementation are described for every example in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, the term "substantially" as used herein means a majority, or almost all, or all, or an amount with a range of about 51% to about 100%, for example. Moreover, examples herein are intended to be illustrative only and are presented for discussion purposes and not by way of limitation.

While embodiments of the present disclosure are explained within the context of providing systems and methods for connecting a plurality of wells for hydraulic fracturing, other uses may be possible. Well sites may include a number of individual wells, where each well may require hydraulic fracturing at some point prior to production. Conventionally, each well would have to be individually connected to an input port to receive hydraulic fracturing fluid. After the hydraulic fracturing of the first well was complete, the input for the hydraulic fluid would have to be reconnected to a second well. The reconnection to the second well may include removing a number of bolts or other physical attachments and manually reattaching various components to allow fluid communication between a hydraulic fracturing source and a specific well. The process of disconnecting and reconnecting various conduits between different wells may be time intensive and potentially hazardous due to the physical nature of the components used to connect the various wells. Additionally, because the process may be time intensive, the cost of hydraulic fracturing may increase, thereby decreasing the cost efficiency of the entire hydraulic fracturing operation for a specific set of wells.

Embodiments of the present disclosure illustrate systems and methods for improvements associated with connecting a hydraulic fracturing fluid source to various wells at a well site. The disclosed systems may decrease the time it takes to reroute (e.g., by use of plugs and a bridge connection) hydraulic fracturing fluid between different wells at a well site. The use of adapters and quick clamp connections may thereby allow hydraulic fracturing fluid to be rerouted between various wells more quickly. As with most systems, an improvement in design such as that disclosed herein, may further decrease the cost, reduce potential hazards, and improve overall safety and efficiency when changing hydraulic fracturing locations. Additionally, the modularity of the disclosed systems may allow a centralized manifold to be relocated to various locations at one or more well sites, thereby further decreasing the cost of assembly, disassembly, etc., typically associated with hydraulic fracturing operations.

Figure 1B:
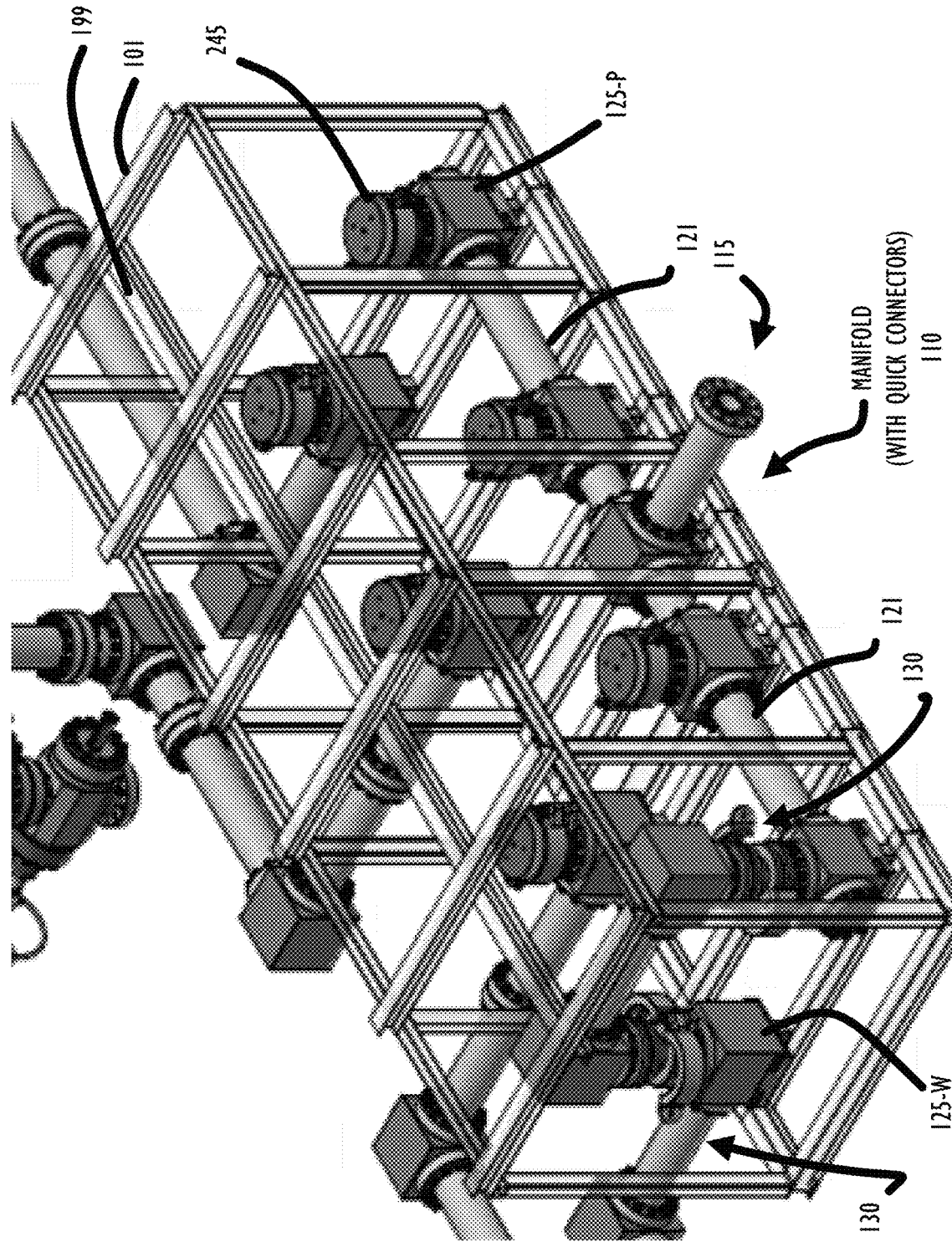

Turning to FIGS. 1A-C, a top perspective schematic representation of a hydraulic fracturing system 100 (or a portion thereof) is illustrated at various levels of magnification, according to embodiments of the present disclosure is shown. In particular, FIG. 1A illustrates an overall hydraulic fracturing system 100 that includes multiple extension spools 140, a frame 101, a carrier rail 199 to assist in repositioning a bridge connection 170, and a manifold 110 within the frame 101. In hydraulic fracturing system 100, there are four extension spools 140 that are respectively associated with four individual wellheads 105.

Figure 2:
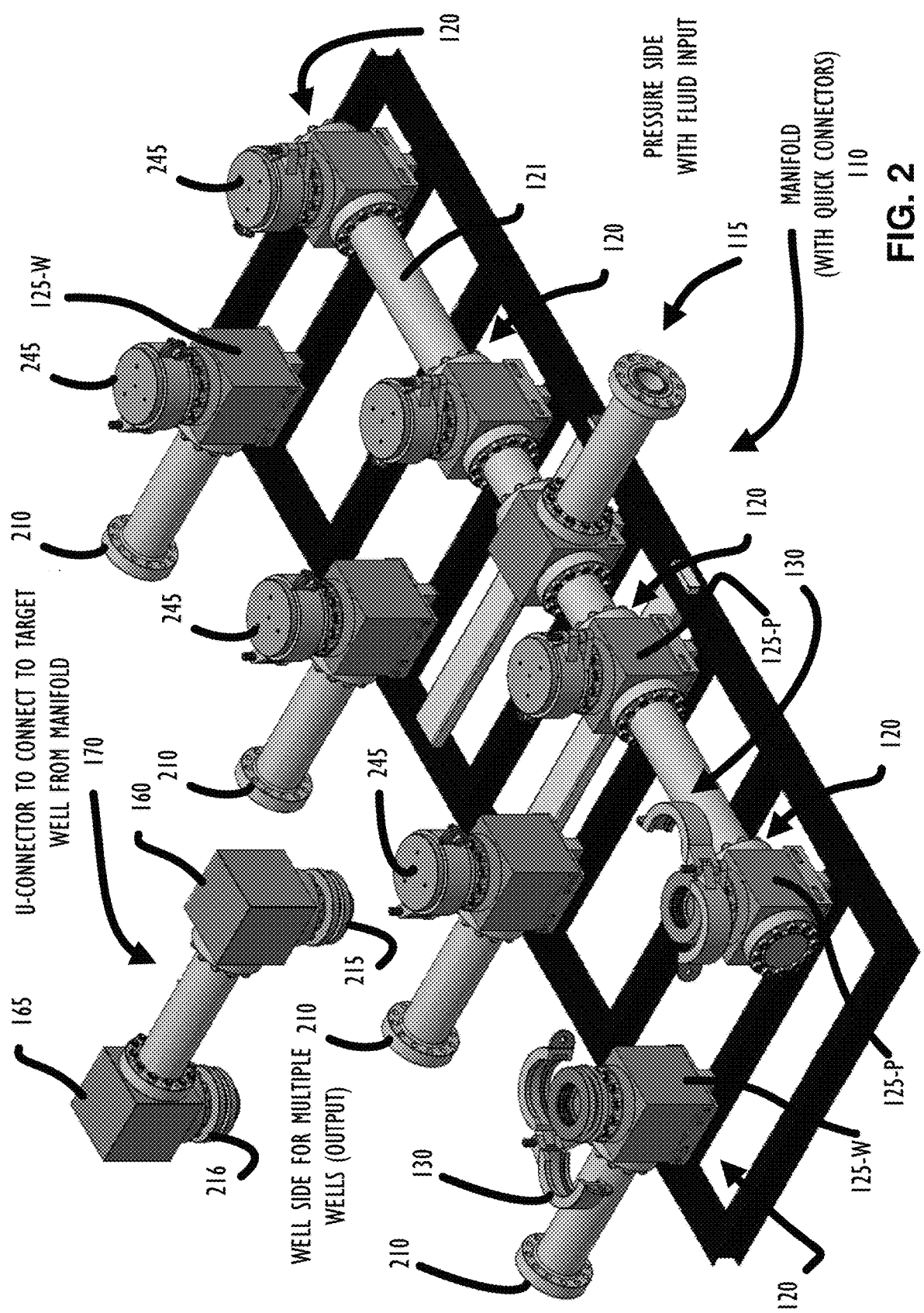
FIG. 2 is a top, perspective, schematic representation of a manifold portion of the hydraulic fracturing system of FIGS. 1A-C, according to embodiments of the present disclosure.

As is more easily seen in FIGS. 1B-2, a single input port 115 may individually supply pressurized hydraulic fluid to a specific target well of the four wellheads 105 by use of a bridge connection 170 for the specific target well and the use of plugs 245 to cap off (i.e., plug) each non-target well (one target well and three non-target wells are used for the examples illustrated). As most clearly illustrated in FIG. 2, the input port 115 is on the "pressure side" of the manifold 110 and individual conduits 210 are provided as output ports on the well side for each associated wellhead 105.

In this embodiment, hydraulic fracturing system 100 is shown having multiple wellheads 105. Four wellheads 105 are shown. However, in other operations, more or less than four wellheads 105 may be connected as part of hydraulic fracture system 100. For example, as few as two wellheads 105 may be connected, or as many as five, six, seven, or more wellheads 105 may be connected.

Hydraulic fracturing system 100 may further include a manifold 110. In accordance with techniques of this disclosure, manifold 110 may be a quick connection manifold that allows hydraulic fracturing fluid to be transferred between various wells. This transfer will, for example, change the target well (from the four possible wells in this example) to become the well that is hydraulically fractured.

Manifold 110 includes a hydraulic fluid input port 115 that is used to intake fluid into manifold 110. Specifically, input port 115 is on the pressure side of manifold 110 and receives hydraulic fluid from a fluid source (not shown). Also, manifold 110 directs (e.g., via bridge connection 170) the hydraulic fluid toward a specific wellhead 105 that is associated with a specific target well. In operation, ports of manifold 110 that are not in use may contain plugs 245.

Hydraulic fluid input port 115 may include an adapter section (not shown) that is configured to attach to a hydraulic fracturing source (not shown) that supplies hydraulic fracturing fluid to manifold 110 and thus the target well that is currently being hydraulically fractured. Hydraulic fracturing fluid may be supplied via supply lines (not shown) that are connected to, for example, pipelines, trucks, and the like, which carry or otherwise supply hydraulic fracturing fluid to manifold 110.

Manifold 110 may further include a set of connectors 120 that are provided to control fluid flow through manifold 110. In this example, there are four connectors 120 on the pressure side and four connectors 120 on the well side. Each of the connectors 120 that are on the pressure side may be in fluid communication (via connecting pipe 121) with hydraulic fluid input port 115, and as such, may be configured to receive a flow of hydraulic fracturing fluid therefrom. Each connector 120 on the pressure side is shown to include a connector body 125-P and a connector clamp 130. Connector clamp 130 may be removably disposed on a respective connector body 125-P. Each of the four connectors 120 that are illustrated on the well side of manifold 110 in this example are shown to also include a connector body 125-W that may be identical or similar to connector body 125-P.

Figure 6:
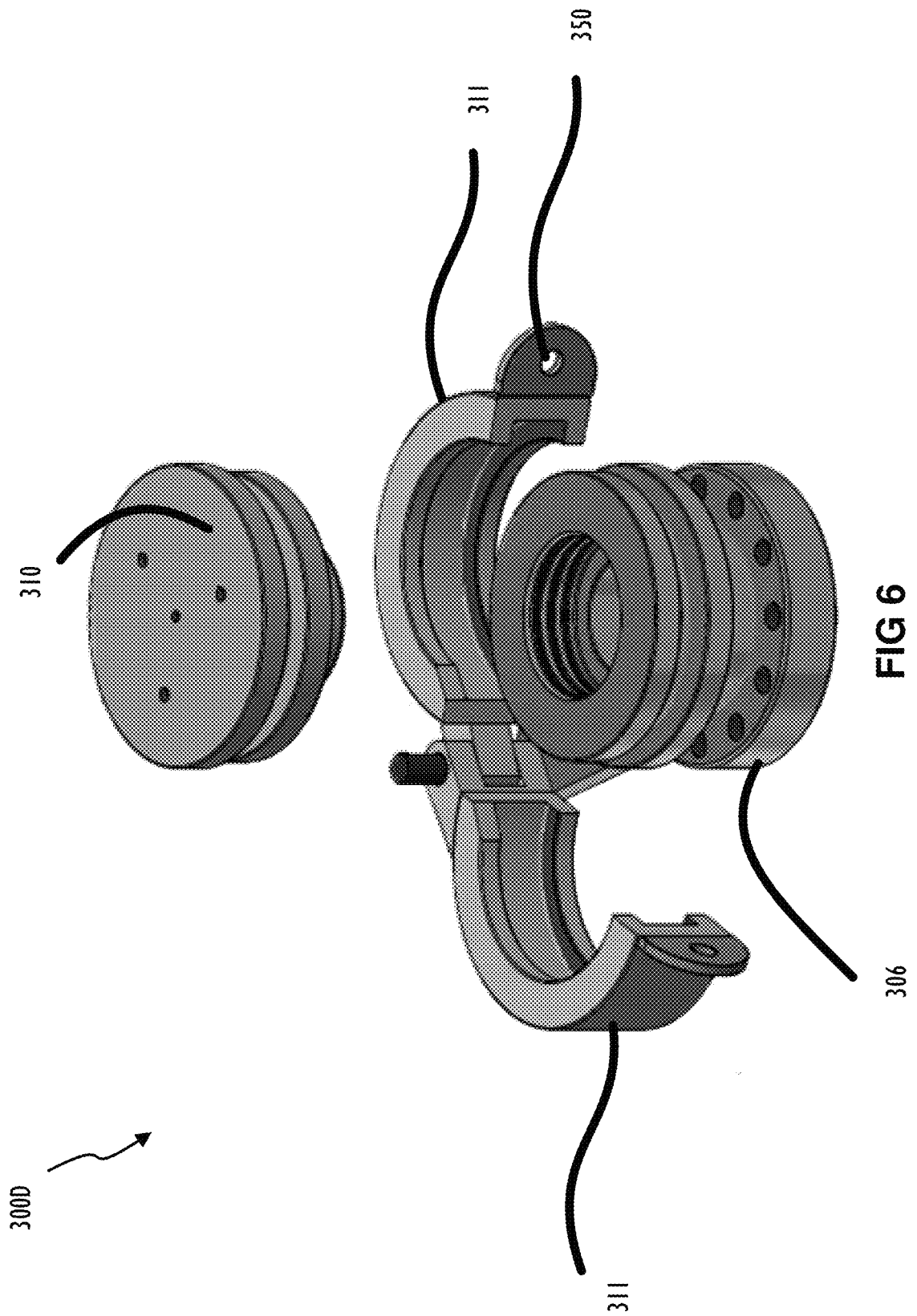
FIG. 6 is a top, perspective view (exploded view), of a clamp connector system, according to embodiments of the present disclosure.
Figure 7:
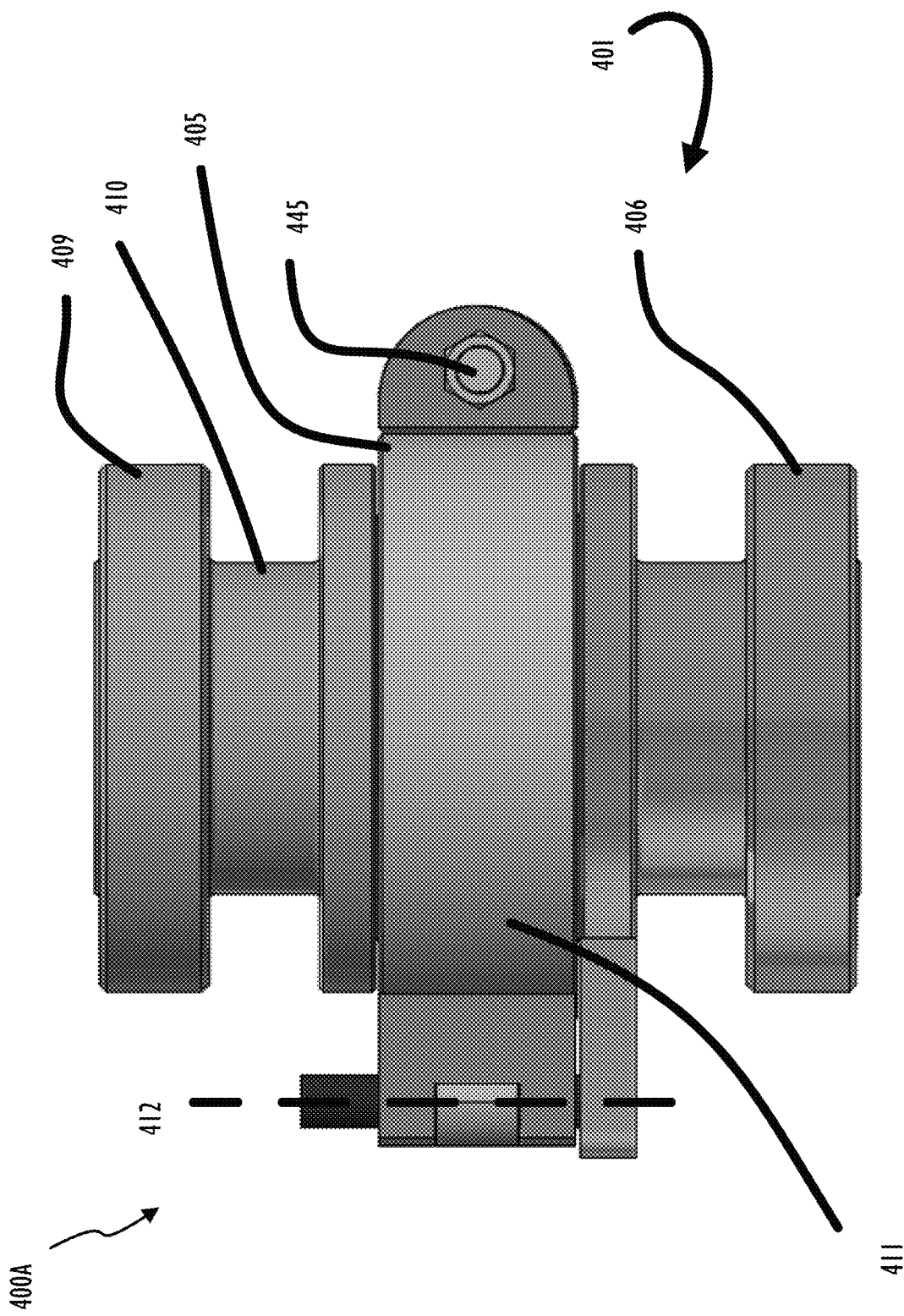
FIG. 7 a side view of a clamp connector system, according to embodiments of the present disclosure.
Figure 8B:
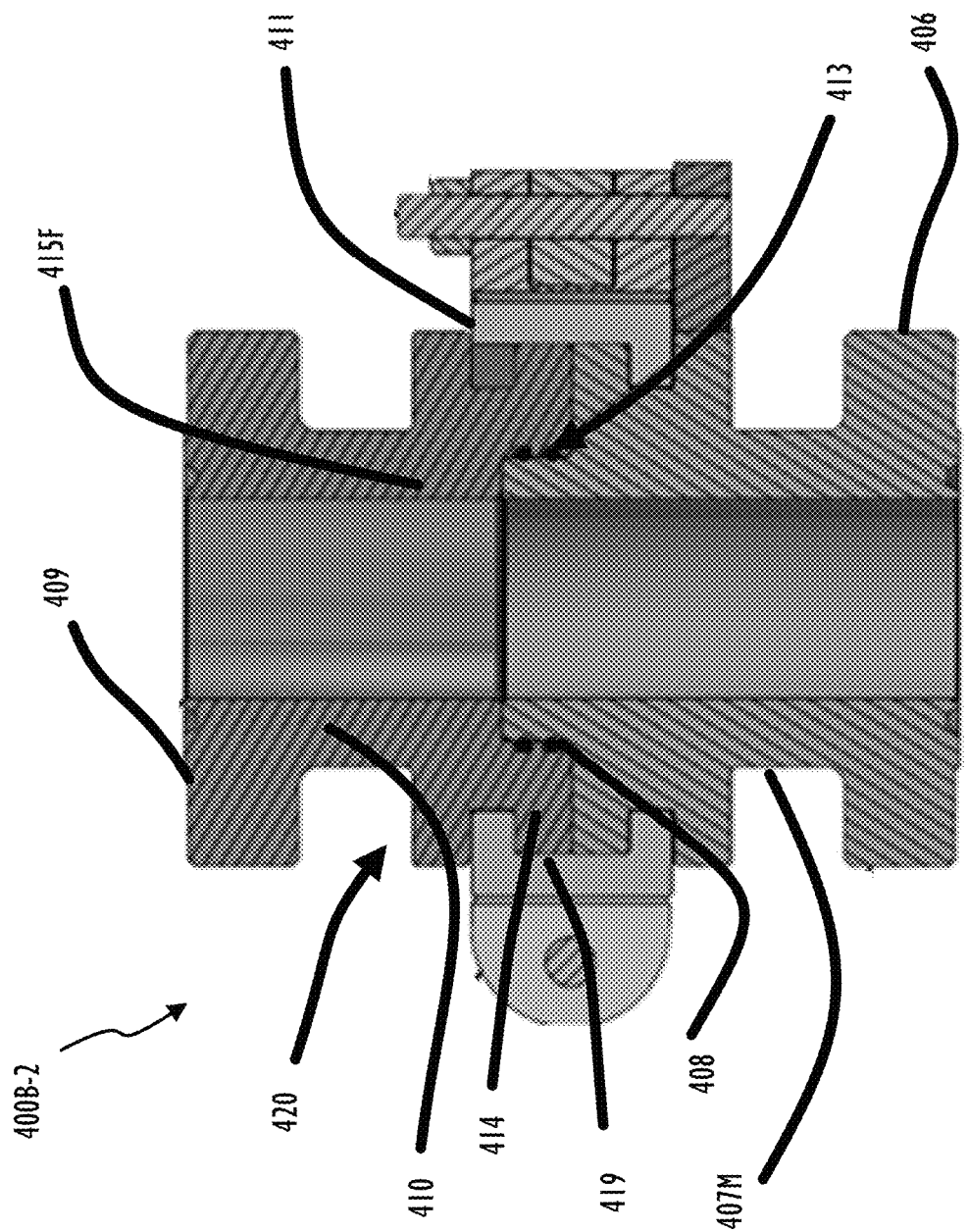
Figure 9:
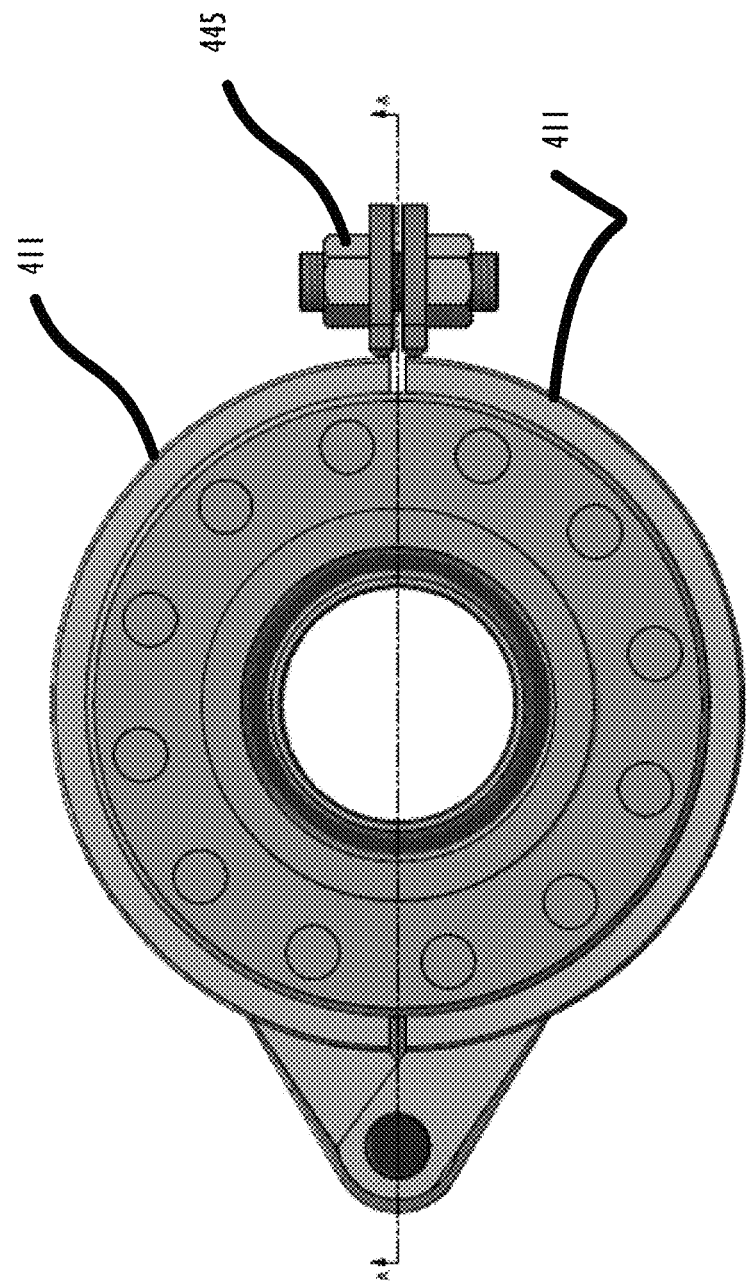
FIG. 9 is a top view of the clamp connector system of FIGS. 7-8, according to embodiments of the present disclosure.
Figure 10:
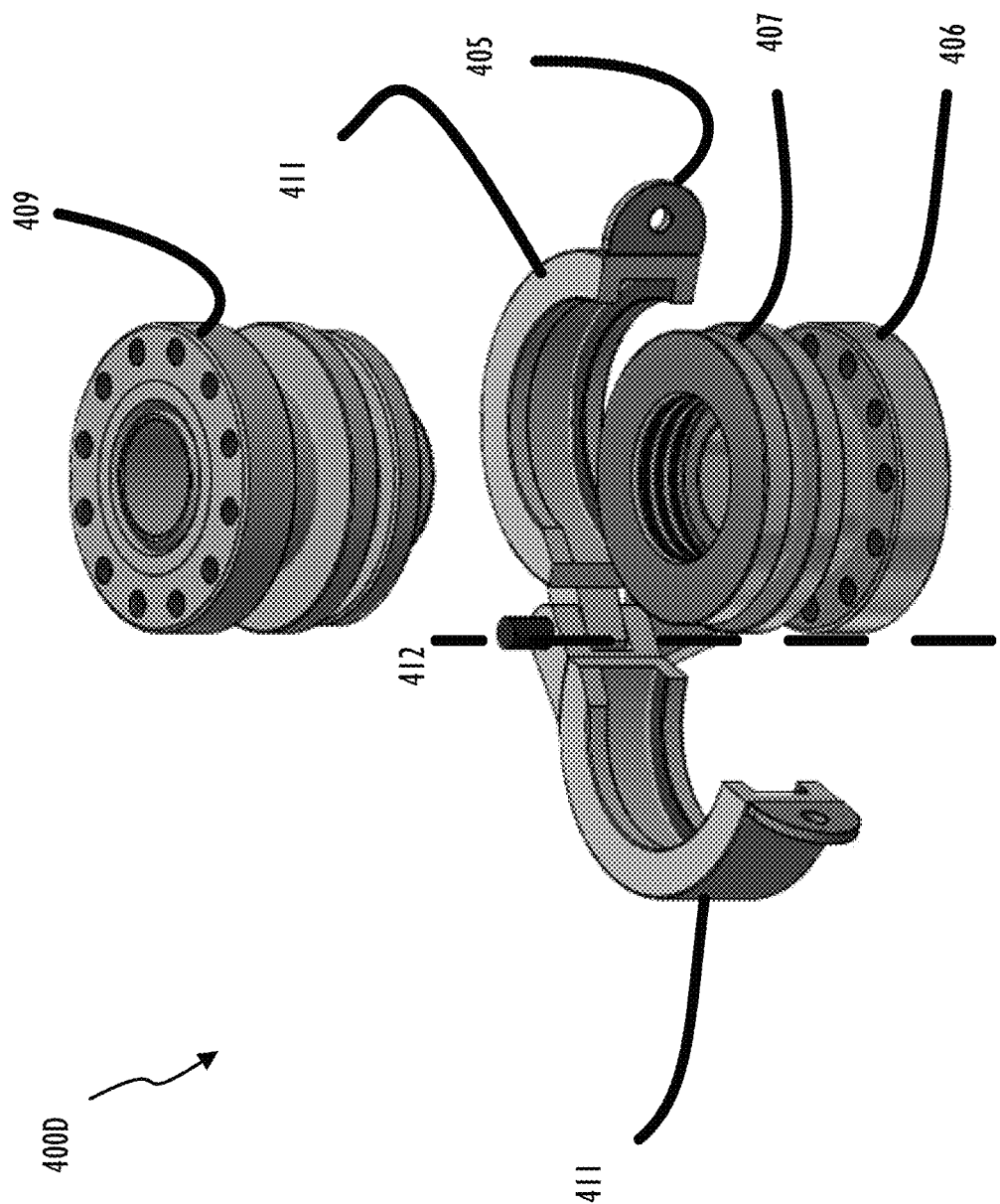
FIG. 10 is a top, perspective view (exploded view), of the clamp connector system of FIGS. 7-9, according to embodiments of the present disclosure.

To connect an individual connector clamp 130 to an associated connector body 125-P or 125-W, a number of mechanical attachments, such as bolts, rivets, and the like may be used (See FIG. 6 for example). During operation, a connector clamp 130 is generally not removed from an associated connector body 125-W or 125-P. However, should service for one or more of the components be required, connector clamp 130 may be removed from connector body 125-W or 125-P. To be clear, in FIG. 2, there are four connector bodies 125-P illustrated in fluid communication with fluid input port 115 and four well side connector bodies 125-W that are each associated with a different wellhead 105. Communication between an individual connector body 125-P and a corresponding well side connector body 125-W is accomplished via connection of bridge connection 170. Connector bodies (both pressure side and well side) associated with wellheads 105 that are not a current target wellhead are illustrated as plugged with a plug 245.

As stated, manifold 110, in this example, includes four connectors 120 disposed on the well side of manifold 110. For convenience, a connector 120 on the well side will be referenced herein as a "well side connector" and each connector 120 on the pressure side will be referred to as "pressure side connector." Each well side connector 120 may be in fluid communication with a wellhead 105 via an extension spool 140. Extension spool 140 may be a pipe or other conduit capable of connecting wellhead 105 to an associated well side connector 120, as well as being capable of conducting a flow of hydraulic fracturing fluid therethrough.

Each well side connector 120 includes a connector body 125-W which also has an associated connector clamp 130 that is removably disposed on connector body 125-W. As explained above, connector clamp 130 may be attached to its corresponding connector body 125-W via a number of mechanical attachments, such as bolts, rivets, and the like.

Hydraulic fracturing system 100 may further include one or more bridge connections 170. Bridge connection 170 may include a first bridge connector 160 and a second bridge connector 165 that are opposite each other and are fluidly connected by a flow channel within bridge connection 170. In operation, first bridge connector 160 may be removably attachable to a first pressure side connector 120 using a connector clamp 130. Similarly, second bridge connector 165 may be removably attachable to a first well side connector 120 using second connector clamp 130. Accordingly, when bridge connection 170 connects a first pressure side connector 120 to a first well side connector 120, fluid communication may be established therethrough. Specifically, fluid will pass through manifold 110 by entering through hydraulic fluid input port 115, flow through connecting pipe 121, and pass into each of the pressure side connectors that have a pressure side connector body 125-P. At that point, the fluid will either hit a plug 245 or be provided to the first bridge connector 160 and thus bridge connection 170. The bridge connection 170 may be positioned across manifold 110 to provide hydraulic fluid to a wellhead 105 for a target well (non-target wells are plugged) via an associated extension spool 140. In some implementations, changing the position across manifold 110 for bridge connection 170 may be assisted via an adapter that allows bridge connection 170 to slide (with reduced weight) across carrier rail 199.

As explained above, in this illustration, manifold 110 is shown with four sets of pressure side connectors 120 and well side connectors 120. However, in other embodiments, as few as two sets of pressure side connectors 120 and well side connectors 120 or more than four sets of pressure side connectors 120 and well side connectors 120 may be present. Further, manifold 110 may include a pressure side connector having a connector body and a connector clamp that are different than those illustrated. In any case, a bridge connection 170 may be used to associate a pressure side connection with a specific well side connection so that alteration through different target wells may be achieved. In general, the bridge connection 170 and a complementary use of plugs 245 may be utilized to implement hydraulic fracturing from a single pressure side input port 115 to multiple target wells.

As an operational example, when hydraulic fracturing fluid is to be rerouted via manifold 110, an installed bridge connection 170 to a first wellhead 105 (e.g., first bridge connection 160) may be removed. Thus, a connection from a first pressure side connector 120 and first well side connector 120 will be disabled (plugs are installed after removal). The bridge connection 170 may then be repositioned and attached to a second (different) pressure side connector 120 and second well side connector 120, thereby providing fluid communication to a different wellhead 105.

Additionally, during operation when a specific pressure side connector 120 and or well side connector 120 is not connected using first bridge connection 160, the pressure side connector 120 and/or well side connector 120 may be plugged, which will be illustrated and described in detail below. By plugging at least, the unused pressure side connectors 120, hydraulic fracturing fluid may be routed, via connecting pipe 121, to a desired wellhead 105. While plugging a well side connector 120 may not be necessary to prevent the flow of hydraulic fracturing fluid from flowing to the incorrect well, plugging well side connectors 120 may be beneficial in preventing the contamination of an unused well side connector 120, extension spool 140, wellhead 105, and the like. Plugging unused well side connectors 120 may also allow for a desired pressure to be maintained within wellhead 105 that is not being hydraulically fractured.

Turning specifically to FIG. 2, a top perspective schematic representation of a manifold for a hydraulic fracturing system is illustrated, according to embodiments of the present disclosure. In this illustration, a portion of frame 101 has been removed, manifold 110 is illustrated not in connection to specific wellheads, as was illustrated with respect to FIGS. 1A-C. Instead, each output conduit 210 of manifold 110 represents what would be flow toward a wellhead 105. In FIG. 2, the operational aspects of manifold 110 are more specifically illustrated. Each well side connector 120 may be connected to a different well (not shown) using separate conduits 210. Each conduit 210 may be connected directly to a well or may be connected using one or more extension spools 140 (shown in FIG. 1), which may provide fluid communication therebetween. Each conduit 210 may receive hydraulic fluid from its associated well side connector body 125-W.

In the illustrated example of FIG. 2, first bridge connector 160 may include a first male connector 215 having a first radial protrusion (e.g., flange) for engaging a first pressure side connector 120. First bridge connector 160 may further include a first tip (See FIGS. 6-10) for engaging a connector clamp 130. Similarly, second bridge connector 165 may include a second male connector 216 having a second radial protrusion for engaging second pressure side connector 120. Second bridge connector 165 may further include a second tip for engaging second connector clamp 130.

During operation, bridge connection 170 may be relatively quickly attached to a specific pair of pressure side connectors 120 and well side connectors 120, thereby allowing fluid communication therethrough. By providing fluid communication through bridge connection 170, hydraulic fracturing fluid may be provided from a source (not shown), through manifold 110, and routed to a specific well.

As described above, during operation, bridge connection 170 may be moved between various pairs (a set of two) of pressure side connectors and well side connectors, thereby allowing a specific well to be hydraulically fractured. Because each individual well side connector 120 is connected to a specific wellhead 105, when bridge connection 170 is moved, the flow path for the hydraulic fracturing fluid may be changed without having to reconfigure other aspects of a hydraulic fracturing system 100. By using connector clamps 130, along with corresponding components of bridge connection 170, the connection between a hydraulic fluid source and a specific well may be changed relatively quickly.

Additionally, because bridge connection 170 may be used to fluidly connect multiple wells as operational goals are changed, the need for additional physical infrastructure is avoided, thereby further increasing operational efficiency and decreasing cost.

When a well is not being hydraulically fractured, specific pressure side connectors 120 and well side connectors 120 may be plugged, or otherwise blocked using blanking plugs 245. Blanking plugs 245 may be removably disposed in specific unused pressure side connectors 120 and/or well side connectors 120, thereby preventing a flow of fluid out of pressure side connectors 120 and/or fluids (or contaminants) into specific unused well side connectors 120. Aspects of blanking plugs 245 are discussed in greater detail below.

Turning to FIGS. 3, 4A, 5, and 6 together, a side view 300A, a cross-sectional view 300B-1, a top view 300C, and a top perspective (partially exploded) view 300D of a clamp connector system 301, respectively, according to aspects of the present disclosure is shown. Cross-sectional view 300B-2 of FIG. 4B illustrates a variation of design for some internal components of clamp connector system 301. Specifically, cross-sectional view 300B-2 has inverted the male and female positions internally within the clamp system so the protrusion is on the lower body 307M component and the blanking plug contains the seals rather than the protrusion. The overall function of the clamp connector system 301 with respect to other elements of this disclosure remains consistent. A similar modification is illustrated below with respect to cross-sectional view 400B-2 (versus 400B-1).

Note in cross-sectional view 300B-2, what was longitudinal protrusion 315M in view 300B-1 has become a female recess 315F. A corresponding change is illustrated for lower body 307F in FIG. 4A with a female recess and lower body 307M in FIG. 4B with a mail protrusion. Other functional aspects of the clamp collector system 301 that function equivalently in each different embodiment are discussed next with reference only to cross-sectional view 300B-1 of FIG. 4A. However, those elements function as described when the internal modification has been made as explained here.

Figure 4A:
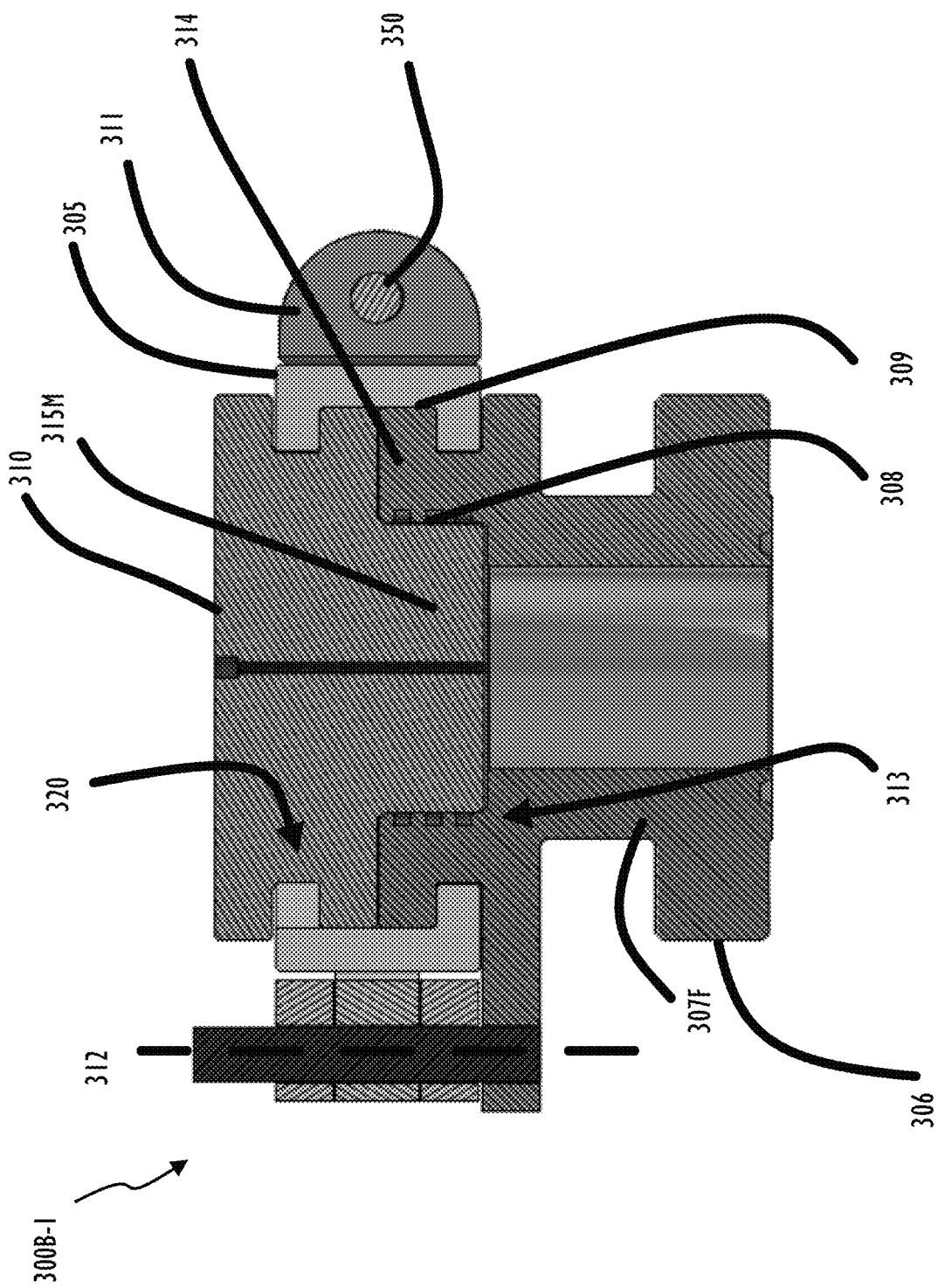
FIGS. 4A-B illustrate a first and second cross sectional view (for slight variations of internal components) of the clamp connector system of FIG. 3, according to embodiments of the present disclosure.
Figure 4B:
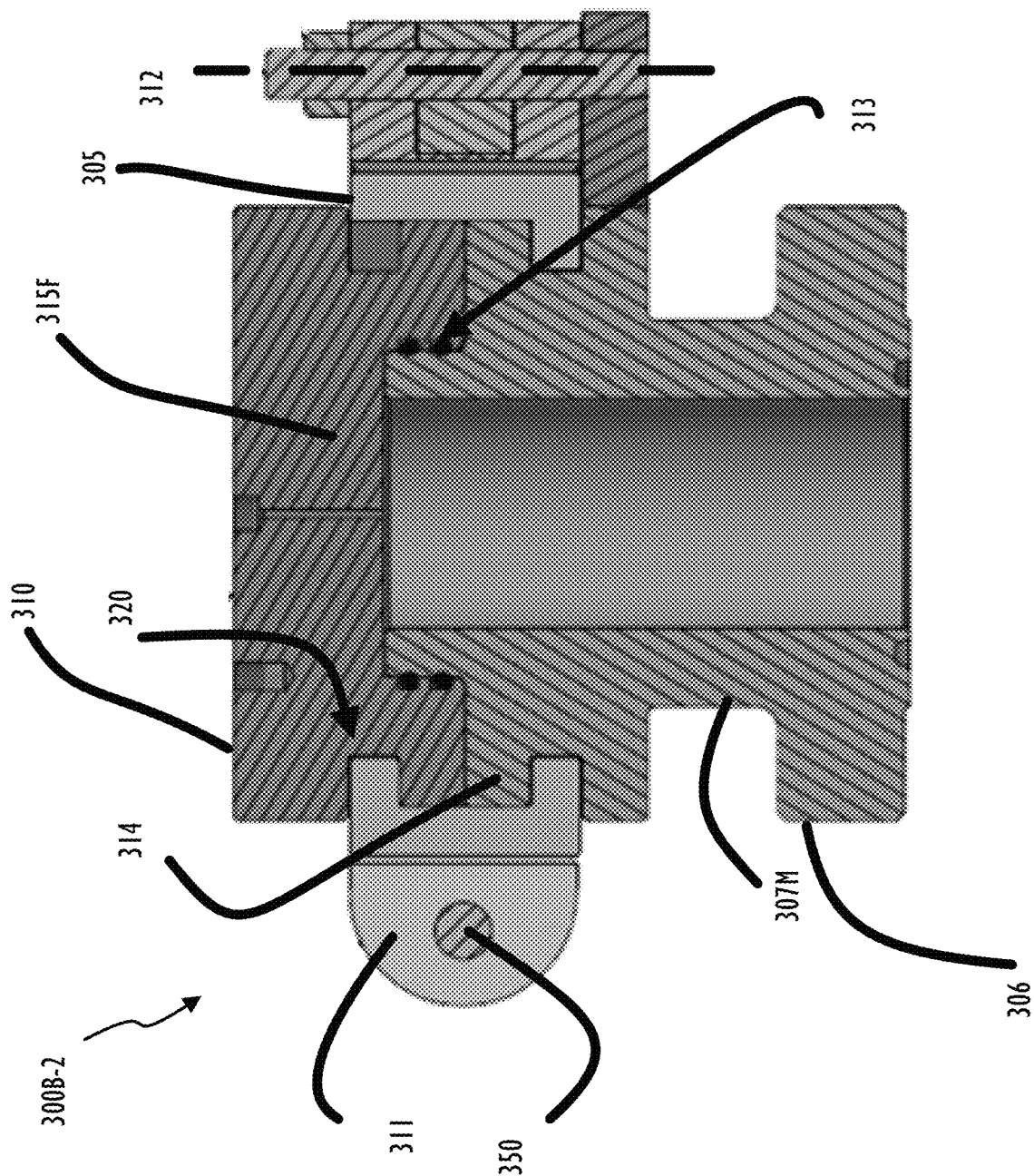

In implementation using the architecture of FIG. 4A, a blanking plug 310 is shown that is secured with a connector clamp 305. Also shown are a lower connector 306 that has a lower body 307F. Together, lower connector 306 and lower body 307F are portions of a quick connector associated with clamp connector system 301. Blanking plug 310 includes a blanking plug body (See FIG. 4) having a longitudinal protrusion 315M. Blanking plug 300 also includes a C-shaped external cross-sectional geometry 320 that protrudes radially outwardly from blanking plug body.

Lower quick connector 306 may have a lower body 307F that includes an inner surface 308 and an outer edge 309. One or more sealing elements 313 may be disposed on inner surface 308. Sealing elements may be formed from, for example, an elastomeric material, such as rubber, plastics, composites, and the like. In some embodiments, the sealing elements may be elastomeric O-rings, although other types of sealing elements may be used in other embodiments.

Connector clamp 305 may have a C-shaped cross-sectional inner geometry that engages both blanking plug 300 and lower quick connector 306, which when engaged forms a corresponding rectangular-shaped cross-sectional geometry. Connector clamp 305 may be disposed on a latitudinal extension 314 of lower body 307F. Connector clamp 305 may also include at least two connector portions 311 that pivot about a connector axis 312. When connector portions 311 are in a closed position, they may be connected through mechanical attachments 345, which is discussed in greater detail below.

After the connector clamp 305 is installed about blanking plug 300 and lower quick connector 306, mechanical attachments 345, such as bolts, may be inserted into corresponding eyeholes 350. After tightening, a completed connection may be formed and blanking plug 300 is securely connected to lower quick connector 306. With the connection formed, hydraulic fracturing fluid and/or well fluids may be prevented from flowing therethrough.

Turning to FIGS. 7, 8A, 9, and 10 together, a side view 400A, a cross-sectional view 400B-1, a top view 400C, and a top perspective view (exploded view) 400D of a clamp connector system 401, respectively, according to aspects of the present disclosure is shown. As explained above for the different implementations of FIGS. 4A-B, FIGS. 8A-B illustrate a similar variation. Cross-sectional view 400B-2 of FIG. 8B illustrates a variation of design for some internal components of clamp connector system 401. Specifically, cross-sectional view 400B-2 has inverted the male and female positions internally within the clamp system so the protrusion is on the lower body 407M component and the blanking plug contains the seals rather than the protrusion. The overall function of the clamp connector system 401 with respect to other elements of this disclosure remains consistent. A similar modification is illustrated above with respect to cross-sectional view 300B-2 (versus 300B-1) in FIGS. 4A-B.

Note in cross-sectional view 400B-2, what was longitudinal protrusion 415M in view 400B-1 has become a female recess 415F. A corresponding change is illustrated for lower body 407F in FIG. 8A with a female recess and lower body 407M in FIG. 8B with a mail protrusion. Other functional aspects of the clamp collector system 401 that function equivalently in each different embodiment are discussed next with reference only to cross-sectional view 400B-1 of FIG. 8A. However, those elements function as described when the internal modification has been made as explained here.

In the implementation including FIG. 8A, a bridge connector 409 is shown that is associated with both a clamp 405 and a lower quick connector 406. Each of these elements is associated with clamp connector system 401. Bridge connector 409 includes a male connector body 410 having a longitudinal protrusion 415M. Bridge connector 409 also includes a C-shaped external cross-sectional geometry 420 that protrudes radially outwardly from male connector body 410.

As explained above, lower quick connector 406 may have a lower body 407F that includes an inner surface 408 and an outer edge 419. One or more sealing elements 413 may be disposed on inner surface 408. Sealing elements 413 may be formed from, for example, an elastomeric material, such as rubber, plastics, composites, and the like. In some embodiments, sealing elements 413 may be elastomeric O-rings, although other types of sealing elements 413 may be used in other embodiments.

Clamp 405 may have a C-shaped cross-sectional inner geometry that engages both bridge connector 409 and lower quick connector 406, which when engaged forms a corresponding rectangular-shaped cross-sectional geometry. Clamp 405 may be disposed on a latitudinal extension 414 of lower body 407F. Clamp 405 may also include at least two connector portions 411 that pivot about a connector axis 412. When connector portions 411 are in a closed position, they may be connected through mechanical attachments 445.

After the clamp 405 is installed about bridge connector 409 and lower quick connector 406, mechanical attachments 445, such as bolts, may be inserted into corresponding eyeholes 450. After tightening, a completed connection may be formed and bridge connector 409 is securely connected to lower quick connector 406. With the connection formed, hydraulic fracturing fluid may be flowed through lower quick connector 406 and into bridge connector 409, thereby allow hydraulic fracturing fluids to be provided to a specific well. To be clear, bridge connector 409 may be associated with respective sides of bridge connection 170 discussed above.

Figure 11:
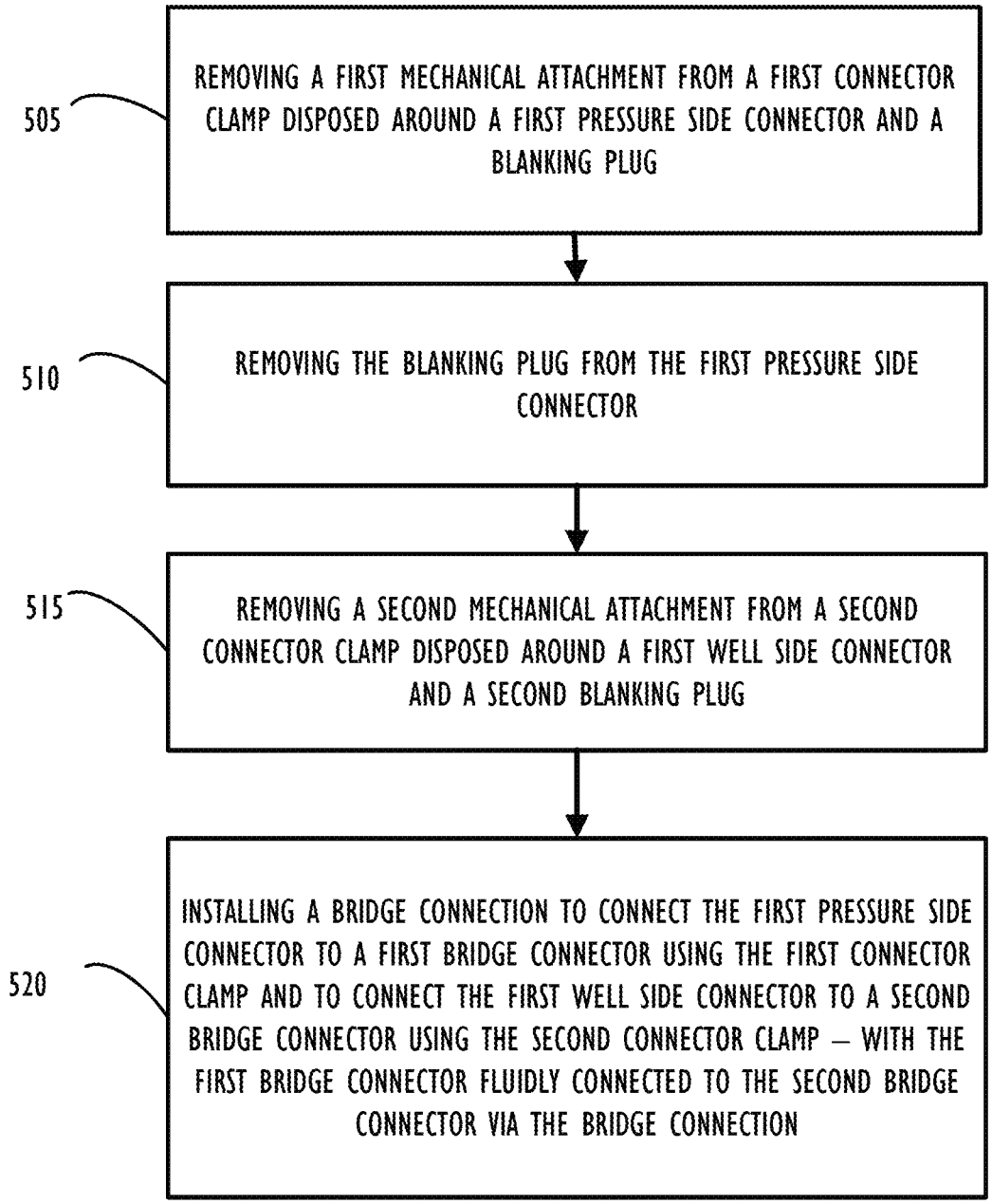
FIG. 11 is a flowchart of a method for connecting hydraulic fracturing components using a bridge connection (e.g., to attach to a target well for flow of hydraulic fluid), according to embodiments of the present disclosure.

Turning to FIG. 11, a flowchart of a method 500 for connecting hydraulic fracturing components according to embodiments of the present disclosure is shown. In operation, method 500 may include removing (block 505) a mechanical attachment from a first connector clamp disposed around a first pressure side connector and a blanking plug. Removing the mechanical attachment may include removing one or more bolts from the first connector clamp, thereby disconnecting the blanking plug from the first pressure side connector. In certain embodiments, the first pressure side connector may use a lower quick connector, as discussed above, onto which the blanking plug was connected while the first pressure side connector was not in use.

In operation, method 500 may further include removing (block 510) the blanking plug from the first pressure side connector. To remove the blanking plug, an operator may lift the blanking plug off of the first pressure side connector. In other implementations, the operator may attach a hook-type attachment to the blanking plug and lift the blanking plug off of the first pressure side connector.

In operation, method 500 may include removing (block 515) a second mechanical attachment from a second connector clamp disposed around a first well side connector and a second blanking plug. Removing the mechanical attachment may include removing one or more bolts from the second connector clamp, thereby disconnecting the second blanking plug from the second pressure side connector. In certain embodiments, the first well side connector may use a lower quick connector, as discussed above, onto which the second blanking plug was connected while the first well side connector was not in use.

In operation, method 500 may further include removing (block 520) the second blanking plug from the first well side connector. To remove the second blanking plug, an operator may lift the second blanking plug off of the first well side connector. In other implementations, the operator may attach a hook-type attachment (not shown) to the second blanking plug and lift the second blanking plug off of the first well side connector.

In operation, method 500 may further include installing (block 525) a bridge connection, wherein the installing comprises connecting the first pressure side connected to a first bridge connector using the first connector clamp and connecting the first well side connector to a second bridge connecter fluidly connected to the first bridge connector using the second connector clamp. The installing may include closing the connector clamps around the bridge connectors and then holding them in place using one or more mechanical attachments, such as bolts. Hydraulic fracturing fluid may then be flowed through first pressure connection, bridge connection, and first well side connection. As the first well side connection may be in fluid communication with a wellhead, the hydraulic fracturing fluid may be flowed into a well associated with the wellhead during a hydraulic fracturing operation.

In certain embodiments, after a hydraulic fracturing operation for the first well is completed, the process may be repeated for a second well. Specifically, a blanking plug may be removed from a second pressure side connector and a second well side connector according to the method described above with respect to the first pressure side connector and the second well side connector. The bridge connection may then be removed from the first pressure side connector and the first well side connector and installed on the second pressure side connector and the second well side connector in the same manner described above with respect to the first pressure side connector and the first well side connector.

While the bridge connection may thereby allow fluid communication between a hydraulic fracturing fluid source and a second well in fluid communication with the bridge connection, the first pressure side connector and the first well side connector may be plugged using blanking plugs. Accordingly, hydraulic fracturing fluid may be pumped into a second well, while no hydraulic fracturing fluid is flowed into the first well.

This process may be repeated for any number of wells located at a well site location. As such, hydraulic fracturing fluid may be flowed into a desired well in a more efficient and more cost effective manner.

In certain embodiments, advantages of the present disclosure may provide systems and methods that allow for faster transitions between components during hydraulic fracturing operations.

In certain embodiments, advantages of the present disclosure may provide systems and method that decrease labor costs associated with hydraulic fracturing operations.

In certain embodiments, advantages of the present disclosure may provide systems and method that increase safety and reduce injury (or even death) associated with working on hydraulic fracturing operations.

Note that embodiments may exhibit one, none, or all of the advantages mentioned above. Furthermore, embodiments may not all manifest any given advantage to the same extent or degree as other embodiments.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method for connecting hydraulic fracturing components, the method comprising:
   removing a mechanical attachment from a first connector clamp disposed around a first pressure side connector and a blanking plug;
   removing the blanking plug from a first pressure side connector;
   removing a second mechanical attachment from a second connector clamp disposed around a first well side connector and a second blanking plug;
   installing a bridge connection, the installing comprising:
      connecting the first pressure side connector to a first bridge connector using the first connector clamp;
      connecting the first well side connector to a second bridge connector fluidly connected to the first bridge connector using the second connector clamp;
   removing the bridge connection from the first pressure side connector and the first well side connector; and
   installing the bridge on a second pressure side connection and a second well side connection.

2. The method of claim 1, wherein the installing the bridge on a second pressure side connection and a second well side connection comprises:
   connecting the second pressure side connector to a first bridge connector using the first connector clamp; and
   connecting the second well side connector to a second bridge connector fluidly connected to the first bridge connector using the second connector clamp.

3. The method of claim 1, wherein the bridge connection provides fluid communication between the first pressure side connector and the first well side connector.

4. The method of claim 1, further comprising:
   installing the first blanking plug on the first pressure side connector; and
   installing the second blanking plug on the first well side connector.

5. A system for connecting a plurality of wells for hydraulic fracturing, the system comprising:
   a manifold;

a first pressure side connector disposed on the manifold, the first pressure side connector having a first connector body and a first connector clamp disposed on the first connector body;

a first well side connector disposed on the manifold, the first well side connector having a second connector body and a second connector clamp disposed on the second connector body; and a bridge connection having an interior flow channel between a first bridge connector and a second bridge connector where, the first bridge connector is removably attachable to the first pressure side connector with the first connector clamp, and the second bridge connector is removably attachable to the first well side connector with the second connector clamp, the bridge connection comprising:

a flow channel;

a first bridge connector having a fluidly sealable connection to the flow channel, the first bridge connector having a first female connector comprising a first radial recess for engaging a first male protrusion of a first pressure side connector, and a first lip for engaging a connector clamp; and a second bridge connector having a fluidly sealable connection to the flow channel, the second bridge connector having a second female connector comprising a second radial recess for engaging a second male protrusion of a first well side connector, and a second lip for engaging a second connector clamp.

6. The system of claim 5, further comprising:

a second pressure side connector disposed on the manifold, the second pressure side connector having a third connector body and a third connector clamp disposed on the third connector body; and a second well side connector disposed on the manifold, the second well side connector having a fourth connector body and a fourth connector clamp disposed on the fourth connector body.

7. The system of claim 6, wherein the bridge connection is removably attachable to the second pressure side connector and the second well side connector.

8. The system of claim 6, wherein the bridge connection is movable between the first well side connector and the first pressure side connector and the second well side connector and the second pressure side connector.

9. The system of claim 6, wherein the manifold comprises a conduit that fluidly connects the first pressure side connector and the second pressure side connector.

10. The system of claim 6, wherein the first well side connector is connected to a first well, the second well side connector is connected to a second well, and the first pressure side connector and the second pressure side connector are connected to an input.

11. The system of claim 5, wherein the first connector body comprises a first radial protrusion that corresponds to a second radial protrusion of the second connector body and the first connector clamp holds the first pressure side connector and the second pressure side connector in engagement by radially holding the first radial protrusion and the second radial protrusion in contact.

12. The system of claim 5, wherein the first connector clamp is disposed on a latitudinal extension of the first connector body.

13. The system of claim 5, wherein the first connector clamp comprises at least two connector portions that pivot about a connector axis and when in a closed position are connected through a mechanical attachment.

14. The system of claim 5, further comprising a blanking plug, the blanking plug having a blanking plug body that corresponds with the first pressure side connector.

15. The system of claim 5, wherein the bridge connection is removably attachable among at least the first pressure side connector, the first well side connector, a second pressure side connector, and a second well side connector.

16. The system of claim 5, wherein the bridge connection provides fluid communication between the first pressure side connector and the first well side connector.

17. The system of claim 5, wherein the bridge connection comprises a top radial protrusion on a top side and a longitudinal extension having a smaller diameter than the first radial protrusion.

* * * * *